(12) United States Patent

Verreault

(10) Patent No.: US 12,618,702 B2

(45) Date of Patent: May 5, 2026

(54) METHODS FOR ASSESSING GROUNDWATER FLOW ZONES

(71) Applicant: HYDRO-RESSOURCES INC., Saguenay (CA)

(72) Inventor: Michael Verreault, Saguenay (CA)

(73) Assignee: HYDRO-RESSOURCES INC., Saguenay (CA)

( * ) Notice: Subject to any disclaimer, the term of this patent is extended or adjusted under 35 U.S.C. 154(b) by 316 days.

(21) Appl. No.: 17/977,061

(22) Filed: Oct. 31, 2022

(65) Prior Publication Data

US 2023/0133249 A1 May 4, 2023

Related U.S. Application Data

(60) Provisional application No. 63/275,258, filed on Nov. 3, 2021.

(51) Int. Cl.
*G01F 1/704* (2006.01)
*E21B 47/11* (2012.01)

(52) U.S. Cl.
CPC ............ *G01F 1/7042* (2013.01); *E21B 47/11* (2020.05)

(58) Field of Classification Search
CPC ........ G01F 1/7042; E21B 47/11; G01M 3/20; G01M 3/22; G01M 3/222
See application file for complete search history.

(56) References Cited

U.S. PATENT DOCUMENTS

| | | | |
|---|---|---|---|
| 6,131,451 A | 10/2000 | Izbicki et al. | |
| 6,393,925 B1 | 5/2002 | Devlin | |
| 2009/0223303 A1* | 9/2009 | Sale ........................ | E21B 47/11 |
| | | | 73/861.07 |
| 2011/0215234 A1* | 9/2011 | Rose ..................... | E21B 47/111 |
| | | | 250/259 |
| 2013/0126158 A1* | 5/2013 | Gupta ..................... | E21B 47/11 |
| | | | 166/250.12 |

FOREIGN PATENT DOCUMENTS

| | | | | | |
|---|---|---|---|---|---|
| GB | 2629256 A | * | 10/2024 | .............. | F24T 10/30 |

OTHER PUBLICATIONS

Field et al., "An Assessment of the Potential Adverse Properties of Fluorescent Tracer Dyes Used for Groundwater Tracing", Environmental Monitoring and Assessment 38: 75-96, Feb. 1995.

* cited by examiner

*Primary Examiner* — Nathaniel J Kolb
(74) *Attorney, Agent, or Firm* — SMART & BIGGAR LP

(57) ABSTRACT

There is disclosed a method of assessing a flow of fluid in a borehole. The method comprises dispersing or mixing a tracer in the fluid of a borehole; and measuring a tracer concentration over a plurality of timepoints at a predetermined location in the borehole, wherein a decrease in the tracer concentration over time at said predetermined location indicates the borehole is in fluid communication with a flow of groundwater at or around said predetermined location.

12 Claims, 4 Drawing Sheets

METHODS FOR ASSESSING GROUNDWATER FLOW ZONES

CROSS-REFERENCE TO RELATED APPLICATIONS

The present application claims priority from U.S. application No. 63/275,258, filed on Nov. 3, 2021. This document is hereby incorporated by reference in its entirety.

FIELD OF THE DISCLOSURE

The present disclosure relates generally to the field of hydrogeology and more particularly to methods for assessing groundwater flow zones.

BACKGROUND OF THE DISCLOSURE

In operating mines, infiltration of water causes stability problems, adds delays in ore recovery and increases the cost of operations. For these reasons, hydrogeological studies are carried out to develop an efficient mine dewatering system and to control water infiltration. Standard hydrogeological studies require fieldwork and analysis using numerical models. Modeling allows the optimization of mine dewatering, and also to better understand several phenomena. After gathering initial information, fieldwork is the starting point for any hydrogeological study. If the quality and precision of the information collected are not sufficient, the analysis carried out could lead to an erroneous interpretation.

Field work usually includes diamond drilling for core recovery, slug test, packer test, flow measurements, and in some special situations, the use of an acoustic camera and spinner flowmeter. These approaches allow to estimate the hydraulic conductivity and assess the heterogeneity of the medium. However, none of these methods allows to clearly identify fractures, faults or other structures that provide sustainable water flow. In fact, an area of high hydraulic conductivity does not necessarily translate to a significant aquifer area capable of providing water on a sustainable basis. High hydraulic conductivity may occur when a fractured zone is local (i.e., trapped water) and not related to another fracture with preferential flow. Using traditional interpretation methods, trapped water could be interpreted as a high flow area. FIG. 1 illustrates two fracture zones crossed by a vertical borehole. The upper fractured zone appears to be very permeable, based on the description of the core (eg. via Rock Quality Designation) although the lower fault could just as well contain water. Traditional tests (packer, flowmeter, etc.) would give high values of hydraulic conductivity for both zones, yet only the lower fracture would carry a perpetual flow because the extent of the fault is large and connected to another regional fault system. Due to the limited area of influence of the packer tests and/or the flow tests (5-10 m), it is likely that the upper fracture zone will lead to a high conductivity value assessment. Accordingly, there is a need for overcoming at least one shortcoming of methods of assessing aquifer areas carrying a preferential flow of water.

SUMMARY OF THE DISCLOSURE

An aspect of the present disclosure relates to a method of assessing a flow of fluid in a borehole. The method comprises dispersing or mixing a tracer in the fluid in the borehole; and measuring a tracer concentration over a plurality of timepoints at a predetermined location in the borehole, wherein a decrease in the tracer concentration over time at said predetermined location indicates the borehole is in fluid communication with a flow of groundwater at or around said predetermined location.

Another aspect disclosed herein relates to a kit for use in assessing a flow of fluid in a borehole, comprising:
- a tracer;
- a measuring probe;
- a device connected to the measuring probe for recording measurements detected by the measuring probe; and
- a cable dimensioned to move the tracer and/or the measuring probe along the length of the borehole.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
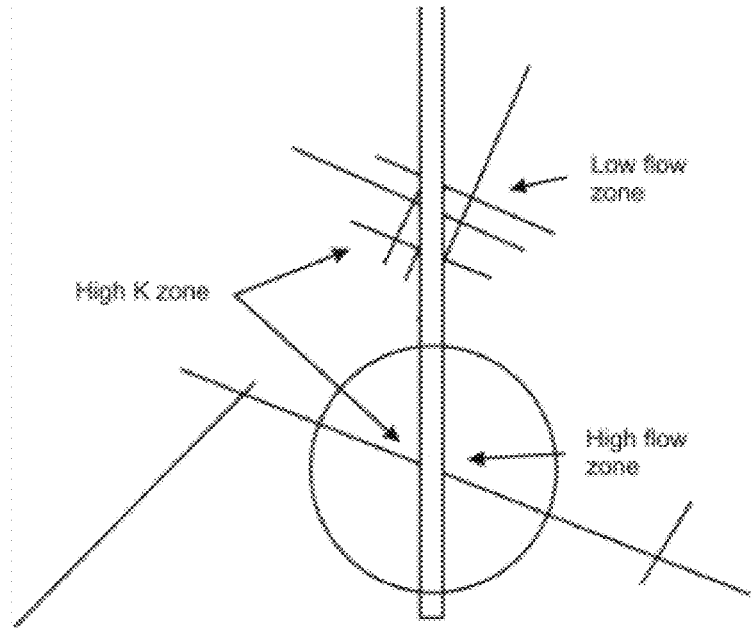
FIG. 1 is a prior art cross-sectional side view of a two fracture zones with variable ambient flow crossed by a vertical borehole.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION OF THE DISCLOSURE

To promote an understanding of the principles of the disclosure, reference will now be made to the features illustrated in the drawings and no limitation of the scope of the disclosure is hereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. In the following description and in the claims, the terms "including" and "comprising" are used in an open-ended fashion, and thus, should be interpreted to mean "including, but not limited to."

As used herein, the term "tracer" means any substance that can become dissolved or suspended in water, or attached to the water molecule. The tracer may then be recovered and/or measured from a water sample to trace and/or characterize flow paths of water through a system. Tracers include without limitation dyes, fluorescent dyes, salts, particles, deionized water, isotopes (for example a stable isotope or a radioactive isotope), a liquid with a predetermined turbidity or temperature.

The articles "the," "a" and "an" are not necessarily limited to mean only one, but rather are inclusive and open ended to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Where two or more ranges are used, such as but not limited to 1 to 5 or 2 to 4, any number between or inclusive of these ranges is implied.

As used herein, the phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures according to the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

Accordingly, it is provided herein a method of assessing a flow of fluid in a borehole. The method comprises measuring changes in tracer concentrations in a borehole at different time intervals after the introduction of a tracer into the groundwater.

For example, the method comprises obtaining the tracer concentration over the plurality of timepoints at one or more additional predetermined locations in the borehole.

For example, the tracer concentration is measured along the length of the borehole.

For example, the method further comprises measuring at least one of hydraulic conductivity, flow rate, Darcy's flux, true flow velocity and vertical flow.

The tracer can be of various nature, because the dispersion and the phenomena of sorption do not have to be considered.

For example, the tracer is a solid powder to be mixed up properly.

For example, wherein the tracer is in solid form such as a tablet form or a powder form.

For example, the tracer is or comprises a dye, a fluorescent dye, a salt, deionized water, an isotope, optionally a stable or radioactive isotope or a liquid with a predetermined turbidity and/or temperature.

For example if the tracer is in liquid form, the tracer is mixed into the hole as uniformly as possible.

For example, the tracer is a fluorescent tracer, optionally chosen from rhodamines family (e.g. B, WT, Sulfo Rhodamines G or B), Xanthenes family (e.g. sodium fluorescein or eosin), Stylbenes family (e.g. tinopal CBX, 5BM, Phorwite or Diphenyl), Aromatic hydrocarbons family (e.g. Lissamine, pyranine or amino G acid), malachite green, methyl blue, chlorophyl, and mixtures thereof.

For example, the tracer is or comprises sodium fluorescein.

For example, the tracer is locally dispersed or mixed around the predetermined location in the borehole.

For example, the tracer is dispersed or mixed throughout the fluid in the borehole, optionally by moving the tracer along the length of the borehole.

For example, a predetermined quantity of tracer is dispersed at a known rate of dispersion.

For example, the method comprises measuring a baseline tracer concentration in the fluid of borehole prior to dispersing or mixing the tracer therein.

For example, the method comprises measuring comprises moving a concentration measuring probe back and forth along the length of the borehole over a period of time, preferably at a constant rate.

For example, the probe is a fluorometer, optionally an optical fluorometer. The skilled person will understand that the suitable probe will be determined For example, wherein the tracer concentration is measured at the predetermined location at time intervals, optionally ranging from 5 minutes to 2 hours For example, the borehole is a pumping well in operation or artesian borehole.

For example, the method further comprises adding an external stress into the aquifer, such as operating a pumping well located in proximity to the tested borehole and repeating the measuring steps, wherein a decrease in the tracer concentration when the pumping well is operated compared to when the pumping well is off, indicates the borehole is in communication with the pumping well through a groundwater flow path with the pumping well.

The method allows to locate the preferential flow zones in the bedrock without inducing stress in the geological formation and/or without the need of water recirculation in the borehole. As such, and advantageously only perpetual flow (and contrasting flow) is visible. If the tracer becomes diluted, this indicates there is a natural water supply through an area of hole, whether in rock or in overburden.

As further described below, the method comprises assessing tracer dilution using Isolated Point Dilution, Dilution Profiles, and/or Vertical Velocity of Isolated Point Dilution.

Isolated Point Dilution

Figure 2:
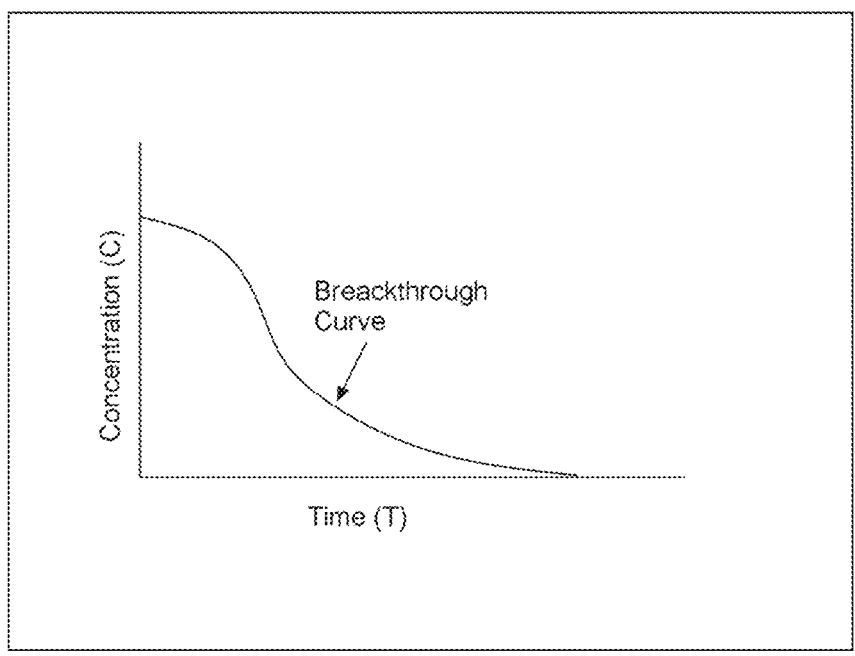
FIG. 2 is a graph showing a Breakthrough curve at a specific location after mixing.

By introducing a tracer at a specific location along a borehole without inducing hydraulic stress, there will be dilution of the tracer induced by a natural flow of groundwater, if such flow is present. This flow is considered generally horizontal. The resulting breakthrough curve is shown in FIG. 2. As can be seen, the breakthrough curve is the tracer concentration versus time in the groundwater at a specific location (depth) along the borehole. The shape of the curve resembles a half-bell, the maximum concentration corresponds to the time when the tracer has been introduced. From FIG. 2, it is possible to determine the following 3 parameters in hydrogeology:

1) Darcy's flux;
2) The flow rate (Q) through that zone; and
3) The hydraulic conductivity (K) at that location.

Figure 3:
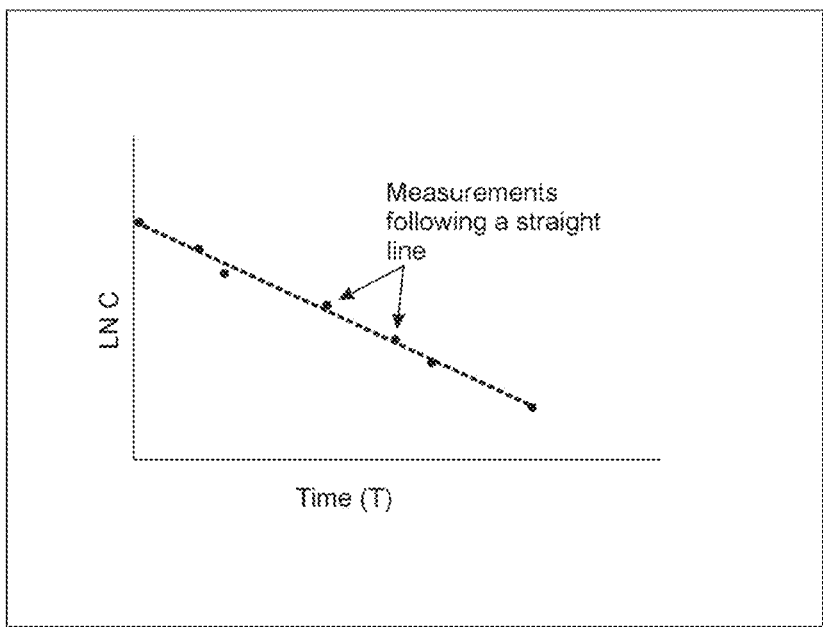
FIG. 3 is a graph showing natural logarithm (LN) of concentration vs time.

To do so, the breakthrough curve is modified by applying a natural logarithm (LN) to the concentration, resulting in a semi-logarithmic graph of the LN of the concentration versus time. Theoretically, the values should line up, as shown in FIG. 3. Once the LN graph is obtained, Darcy's flux can be calculated as follows:

$$v=(m*(PI*r/2))/L$$

where:
v: Darcy's flux;
m: Slope of the straight line;
PI: 3.1416;
r: Radius of the borehole; and L: Length of the borehole.

Darcy's law can be applied to determine the hydraulic conductivity:

$$v=Ki, \text{ and } K=v/i$$

where:
K: Hydraulic Conductivity of the tested zone;
i: Horizontal hydraulic gradient; and
v: Darcy's flux.

Once the above parameters are determined, the flow rate (Q) may be determined with the equation taken from the following Darcy's law:

$$Q=KiA$$

where:
Q: Flow rate through that zone;
K: Hydraulic Conductivity of the tested zone;
i: Horizontal hydraulic gradient; and
A: Area of a semi cylinder representing half of the borehole.

These parameters can be determined by introducing a tracer at a given location and for a specific duration. However, this method is long and to define values along a deep borehole (e.g. 500 m) it would take a very long time to characterize the flow along the entire borehole: then the profiles of dilution need to be integrated. The technique described above consists of a dilution point tracing test, as only one location would be tested, which remains useful when the dilution is fast.

Tracer Dilution Profiles (TDP)

Figure 4:
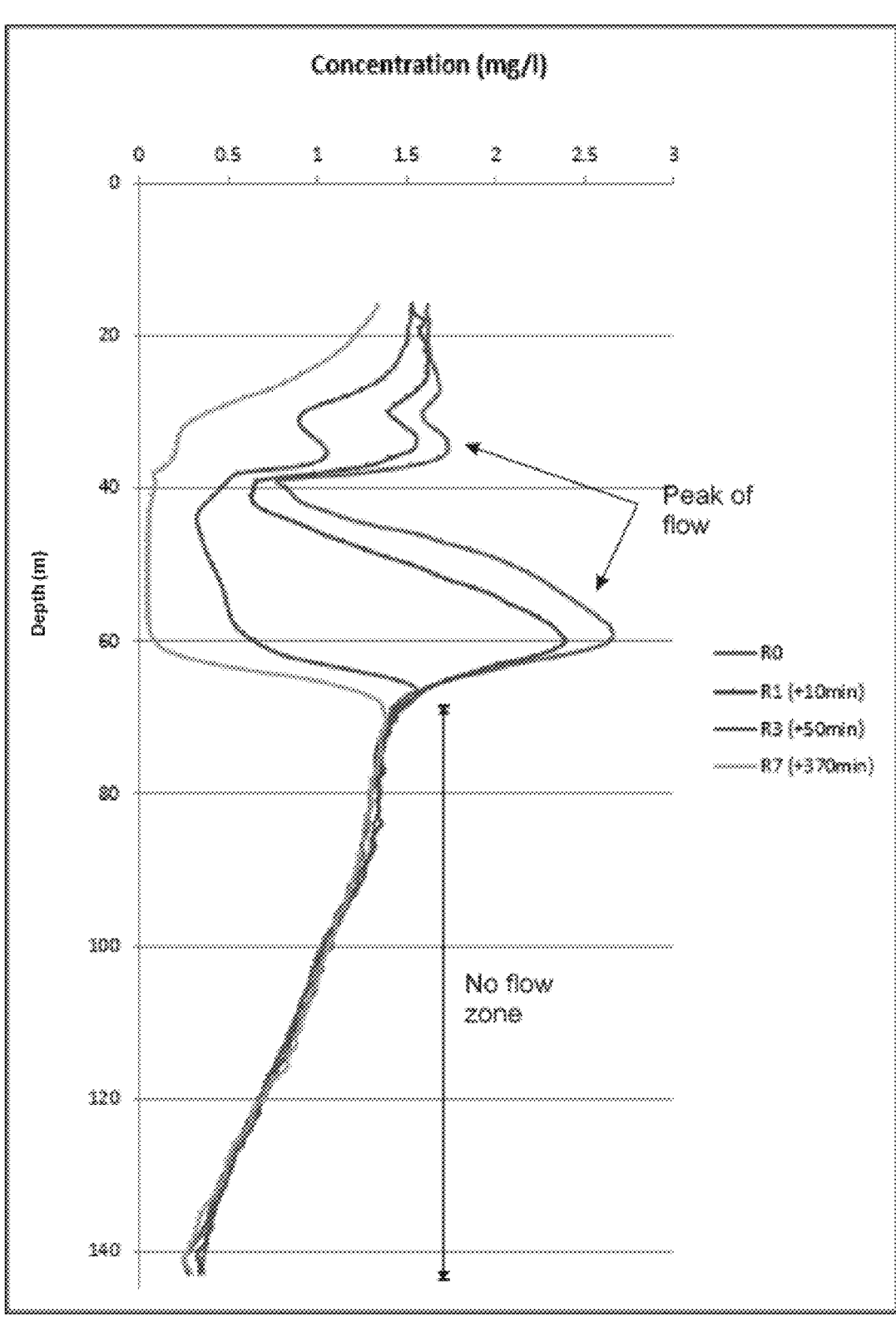
FIG. 4 is a graph showing tracer dilution profile (TDP) results in a borehole.

TDP comprises mixing a tracer as uniformly as possible along a borehole and measuring the concentration changes over time in the same borehole. This results in a series of concentration profiles as a function of depth: each profile corresponding to a given time after the tracer has been mixed. FIG. 4 shows an example of TDP results in a borehole. The Y axis corresponds to the depth (in meters) in the borehole and the X axis corresponds to the tracer concentration (or measured unit). A change in concentration in a location is caused by ambient flow causing that change. It is therefore possible, using such concentration versus depth graph and the preceding equations, to determine at any point along the borehole, the following elements:

The contrasting flow zones;
The hydraulic conductivity (K) along the borehole;
The flow rate (Q) along the borehole;
The Darcy's flux (v) along the borehole; and
True flow velocity along the borehole if the porosity is known.

Vertical Flow

When a borehole intersects more than one flow zone, vertical flow can occur. The velocity of the vertical flow may be measured to obtain the flow going between two flow zones to be able to adjust the hydraulic conductivity calculations. To define the vertical flow velocity, the profiles must be analyzed over several time intervals after the introduction of the tracer. The profiles will identify irregularities that move along the borehole, e.g. by following these irregularities, measuring their distances, and knowing the time interval between each profile.

Since the velocity is a distance divided by a unit of time, the velocity of the vertical flow between an interval may be obtained. By multiplying the flow in the borehole, i.e. the velocity, by the transversal area of the cylinder, the flow rate associated with this vertical flow occurrence is obtained.

Once the flow rate is known, the hydraulic conductivity in the flow zones can be calculated by applying Darcy's law as follows:

$$Q=KiA, \text{therefore } K=Q/iA$$

where:

K: Hydraulic Conductivity of the tested zone;

Q: Flow rate through that zone;

i: Horizontal hydraulic gradient; and

A: Area of a semi cylinder representing half of the borehole.

The flow is then limited by the least permeable flow zone. The gradient can be achieved with the use of inflatable packers and pressure probes.

Also disclosed herein is a kit for use in assessing a flow of fluid in a borehole.

For example, the kit further comprises a reel (or spool) around which the cable is wrapped, the reel being dimensioned to allow the probe to be lowered and raised into the borehole.

For example, the tracer is in solid form. For example, the tracer is in a tablet form or a powder form.

For example, the tracer is or comprises a dye, a fluorescent dye, a salt, deionized water, an isotope, optionally a stable or radioactive isotope or a liquid with a predetermined turbidity and/or temperature. For example, the tracer is a fluorescent tracer, optionally chosen from rhodamines family (e.g., B, WT, Sulfo Rhodamines G or B), Xanthenes family (e.g., sodium fluorescein or eosin), Stylbenes family (e.g., tinopal CBX, 5BM, Phorwite or Diphenyl), Aromatic hydrocarbons family (e.g., Lissamine, pyranine or amino G acid), malachite green, methyl blue, chlorophyl, and mixtures thereof.

For example, the probe is a fluorometer, optionally an optical fluorometer.

For example, the device is a data logger.

Examples

Tracer Dilution Profiles

1—A tracer is mixed along the borehole, as uniformly as possible. To carry out this process one of 2 options may be used: a) use a tracer tablet with a defined compression, which is placed into a specially developed capsule or b) use a quantity of powder, for example approximately 15 mL, coated in a coffee filter and attached to a fluorometer or any other mixing device. For example, wherein the flow is fast, the amount of powder may be increased for example to 30 mL. The tracer is then lowered as quickly as possible in the borehole and is then ascended at constant speed. The mixing may for example be completed in a single round trip. Preferably, the tracer is not injected with water, as this may induce a divergent flow and cause an overestimation of the hydraulic conductivity results. If a liquid mix is required (i.e. tracer injected with water), the injection flow rate may be compensated by pumping in the same tested hole until the mix is completed, so a stress is not applied to the aquifer.

2—A first concentration profile is carried out before mixing the tracer in the borehole. This makes it possible to obtain the initial concentration (background) before mixing to properly discriminate the tracer.

3—To perform a profile, an optical fluorometer probe is installed at the end of a cable of variable length. It will be understood hat depending on the tracer applied, other appropriate devices may be used. The fluorometer measures a fluorescence intensity varying according to the concentration of a fluorescent tracer such as rhodamine or fluorescein.

The tracer can include ions, dyes, etc. preferably a tracer that can be mixed without water injection. The cable that attaches the probe is wound in a reel. This reel allows the probe to be lowered and raised at controlled speed. Thus, it is desirable to make the profiles starting from the bottom of the borehole, towards the top. The ascent rate is preferably constant and known. The cable is graduated, and the ascent times are recorded. A tachometer (or the equivalent) can also be attached to the borehole, so the location of the probe is known at all times.

4—The probe is connected to a data logger, which measures and stores every second, the signal emitted by the probe. This signal is transferred in real time to a computer via a wireless communicator or using a cable with a rotating connector. The software used on the computer allows the voltage (or concentration) values to be displayed in real time as a function of time. The values may also be gathered by the datalogger and downloaded afterward.

5—As mentioned, an initial profile is carried out before mixing the tracer. Then the tracer is mixed in the borehole, and a profile (#1) is made immediately after mixing. Normally, another profile (#2) is performed in sequence after profile #1 to assess the dilution rate. Depending on the results, other profiles are carried out in the same borehole, at varying intervals. In fast flowing media, a profile can be performed every 5 minutes for 2 hours. In an aquifer with little flow, a profile can be performed every 30 minutes for 24 hours. The site engineer assesses the time between the completion of the profiles.

6—Once the profiles are completed, they are analyzed as follows. Graphs of voltage/concentration versus time are plotted and transferred on a graph of voltage versus depth. It is therefore desirable to know the speed of the ascent and the total length of the race covered so as to obtain a depth to each data stored. If a tachometer is used, it is possible to relate the concentration values to the depth of the probe at a given time.

7—Once the concentration curves are converted in depth, all curves can be compared together and the breakthrough curves at every defined depth along the borehole can be generated.

Surrounding Wells are Switched on and Off to Change the Regional Flow:

As it is the velocity that is measured and not the hydraulic conductivity, it is possible to make links between the permeable flow zones, depending on whether surrounding wells are pumped or not. For example, Tracer Dilution Profiles are carried out in a borehole, as described above, and certain results are obtained. Subsequently, a pumping well located nearby (e.g., 1 km to 20 km from the borehole) is operated (or started) and the tracer test is repeated in the borehole. If a flow zone connects the tested borehole to the pumping well, the flow velocity will change (amplify) in the borehole and the rate of dilution will occur faster. The profiles (in the borehole) without and with operating (or starting) of the pumped well will therefore be different indicating that one or more flow zones are connected with the pumping well. This method has been found to be particularly advantageous as it allows to locate these links between the permeable flow zones in the tested borehole without having to perform a convergent tracing test.

Tracer Dilution Profiles (TDP) Test in a Pumping Well or in an Artesian Borehole:

TDP experiments were also conducted directly in a pumping well in operation or in an artesian borehole. In such cases, flow zones are easily identifiable, but the basic equations for calculating the hydraulic conductivity are no longer applicable, because of the presence of stress associated with the profiles. However, the basics of profile generation remain the same.

The location of the pump, and the pumping rate in the tested well may affect the tracer movement in the well.

Isolated Point Dilution:

When the groundwater flow is too fast in a particular area, the tracer washes out too quickly in this area making it difficult to measure the variations in concentrations at that particular area or around the area. In such scenario, an isolated point dilution tracer test is performed. The test comprises introducing the tracer at a single location along the borehole and measuring the variation of concentration at that precise location. The complete breakthrough curve for that location may then be completed and other calculations determined. Packers can be used to isolate the tracer within an interval and avoid vertical flow, if desired.

Figure 5:
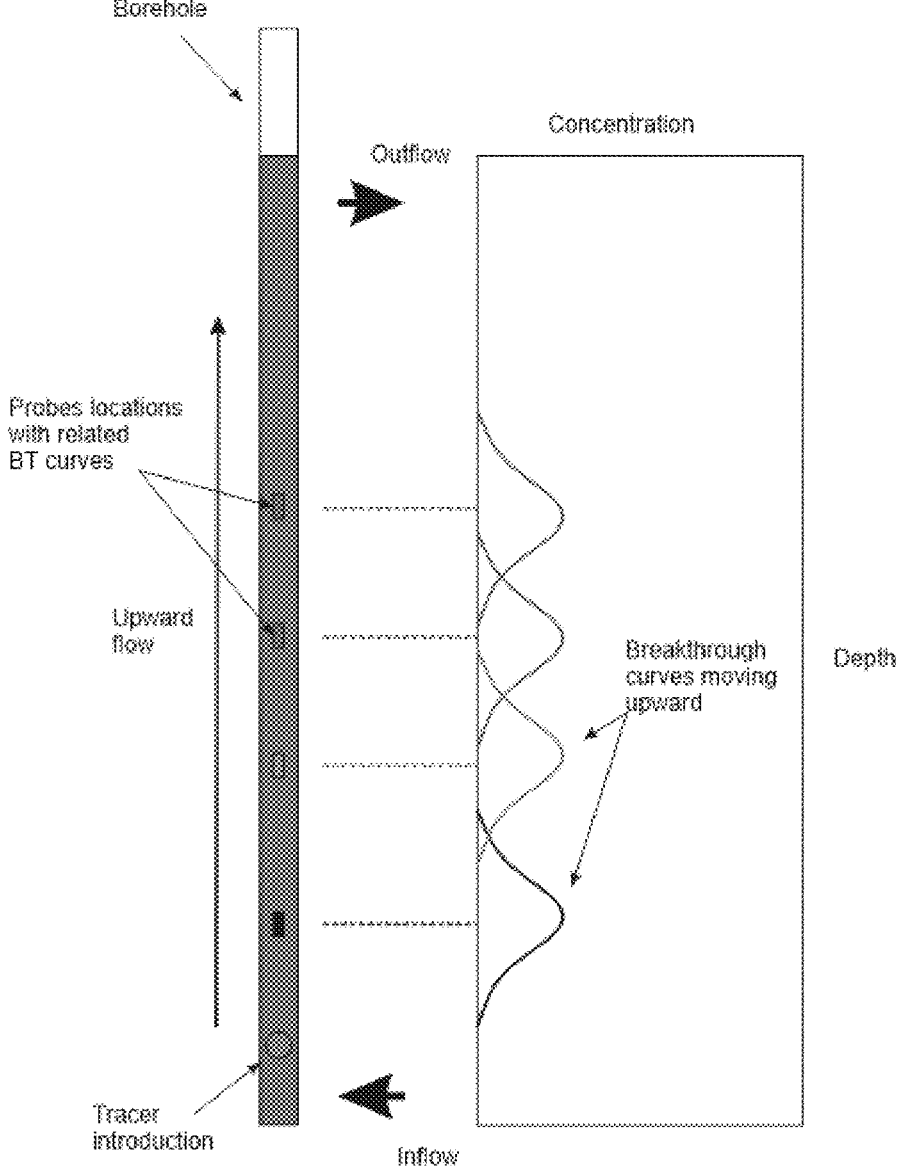
FIG. 5 is a schematic showing breakthrough curves measured for different depths along the borehole.

Measurement of the Vertical Speed Using a Test by Dilution Point:

Testing of vertical flow speed was conducted where the vertical flow is important, as follows. A tracer was inserted at a specific location, measuring the full breakthrough curve (as shown in FIG. 5) and moving the probe up or down to evaluate if the tracer is also moving was conducted. If the tracer is moving, it will then be possible to measure its time of travel by calculating the average transfer time of the breakthrough curve. This measurement can be carried out at different places along the borehole and several breakthrough curves can thus be obtained. The vertical velocity is therefore measured over different intervals. In the case of a decrease in the total mass between two measurement points, the mass loss will make it possible to locate the presence of an additional flow zone.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A method for characterizing natural hydraulic exchange zones within a water-containing borehole, comprising:
   (a) introducing into the borehole water a tracer element that dissolves or disperses to release a tracer material along substantially the entire water column of the borehole;
   (b) allowing the borehole to remain under ambient hydraulic conditions, without applying any internal hydraulic stress to the borehole water or surrounding formation;
   (c) performing a first measurement of tracer concentration by moving a probe vertically along the borehole at a substantially constant speed to generate a depth-resolved concentration dataset;
   (d) repeating step (c) at two or more subsequent times after the initial tracer release, without further mixing of the borehole water or additional tracer addition, to obtain successive depth-resolved concentration datasets;
   (e) comparing the successive datasets to determine local variations in tracer concentration over time; and
   (f) identifying natural hydraulic inflow and outflow zones along the borehole based on the local variations.

2. The method of claim 1, further comprising measuring at least one of hydraulic conductivity, flow rate, Darcy's flux, true flow velocity and vertical flow.

3. The method of claim 1, wherein a predetermined quantity of tracer is dispersed.

4. The method of claim 1, further comprising measuring a baseline tracer concentration in the fluid of borehole prior to introducing the tracer.

5. The method of claim 1, wherein the tracer is or comprises a dye, a fluorescent dye, a salt, deionized water, an isotope, a stable or radioactive isotope or a liquid with at least one of a predetermined turbidity and temperature.

6. The method of claim 1, wherein the tracer is a fluorescent tracer chosen from rhodamines family, Xanthenes family, Stylbenes family, Aromatic hydrocarbons family, malachite green, methyl blue, chlorophyl, and mixtures thereof.

7. The method of claim 1, wherein the probe is a fluorometer.

8. The method of claim 1, wherein the borehole is a pumping well or artesian borehole.

9. The method of claim 1, further comprises operating a pumping well located in proximity to the borehole and repeating step (a), wherein a decrease in the tracer concentration when the pumping well is operated compared to when the pumping well is off indicates the borehole is in fluid communication with a flow of groundwater that is in fluid flow communication with the pumping well.

10. The method of claim 1, wherein the probe is an optical fluorometer.

11. The method of claim 10, further comprising performing step (c) at least four times.

12. The method of claim 1, further comprising performing step (c) at least three times.

* * * * *